F. T. ROBERTS.
APPARATUS FOR MAKING PNEUMATIC INNER TUBES.
APPLICATION FILED SEPT. 15, 1919.

1,387,616.

Patented Aug. 16, 1921.

2 SHEETS—SHEET 1.

INVENTOR.
Fred Thomas Roberts,
BY
Baker & Macklin
ATTORNEYS.

F. T. ROBERTS.
APPARATUS FOR MAKING PNEUMATIC INNER TUBES.
APPLICATION FILED SEPT. 15, 1919.
1,387,616.
Patented Aug. 16, 1921.
2 SHEETS—SHEET 2.
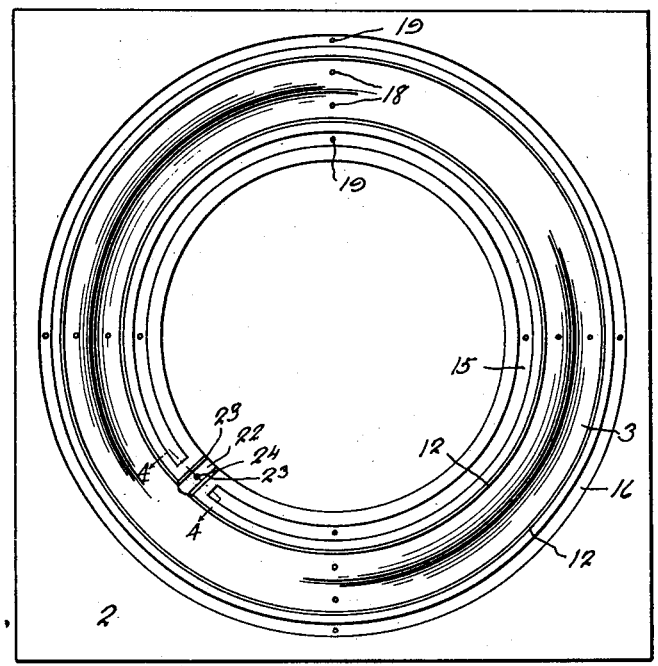
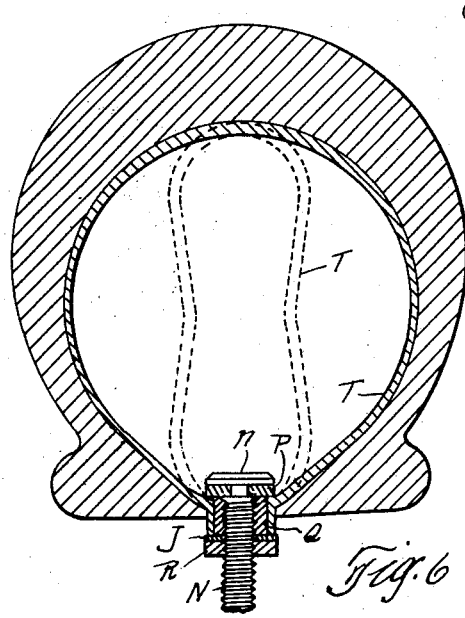
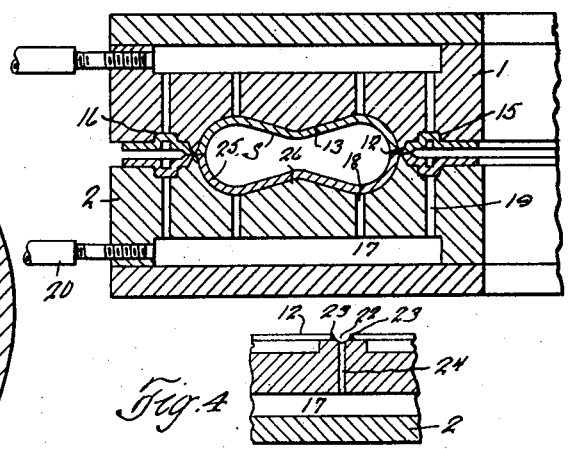
INVENTOR.
Fred Thomas Roberts,
BY
Baker & Macklin,
ATTORNEYS.

UNITED STATES PATENT OFFICE.

FRED THOMAS ROBERTS, OF CLEVELAND, OHIO, ASSIGNOR TO PARAMOUNT RUBBER CONSOLIDATED, INC., OF PHILADELPHIA, PENNSYLVANIA, A CORPORATION OF DELAWARE.

APPARATUS FOR MAKING PNEUMATIC INNER TUBES.

1,387,616.     Specification of Letters Patent.     Patented Aug. 16, 1921.

Application filed September 15, 1919. Serial No. 323,851.

*To all whom it may concern:*

Be it known that I, FRED THOMAS ROBERTS, a citizen of the United States, residing at Cleveland, in the county of Cuyahoga and State of Ohio, have invented a certain new and useful Improvement in Apparatus for Making Pneumatic Inner Tubes, of which the following as a full, clear, and exact description, reference being had to the accompanying drawings.

The object of this invention is to provide a simple and efficient apparatus for manufacturing annular hollow rubber articles; for example, inner tubes for pneumatic tires. It is desirable to form articles of this character of two pieces of rubber stock joined by peripheral vulcanized seams, thus doing away with the stretching and buckling which results when a straight tube is formed into an annulus and obviating the leakage frequently consequent upon securing the overlapped ends by cement.

The present apparatus is designed to hold annular rubber stock upon the faces of mold members and pneumatically seat such stock in annular channels in the mold members and join the parts of the seated stock together to produce the complete article with the peripheral seams. The invention is hereinafter described more in detail in connection with the accompanying drawings and the essential novel characteristics are set out in the claims.

Figure 1:
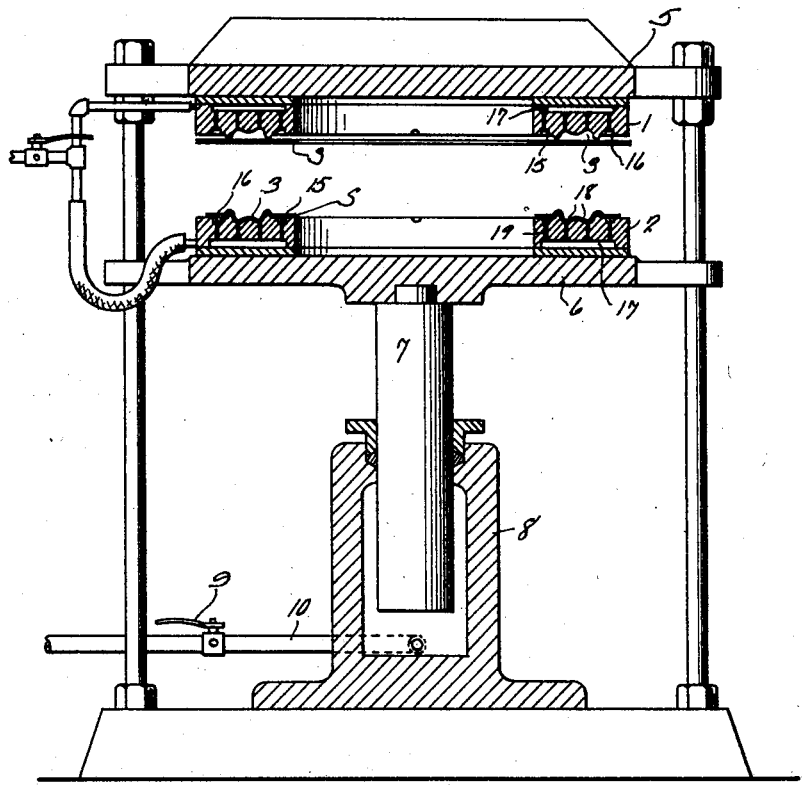
Figure 5:
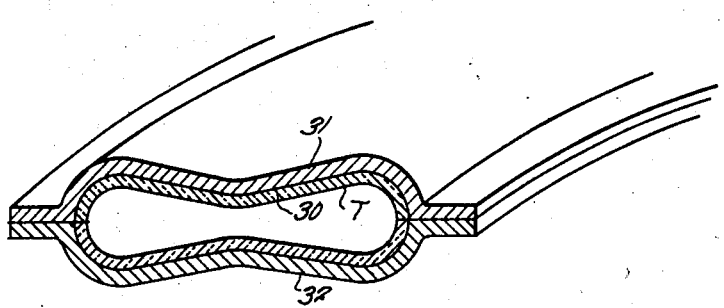

In the drawings, Figure 1 is a transverse section through a pair of mold members and a suitable press for bringing them into conjunction. Fig. 2 is a plan of one of the mold members; Fig. 3 is a vertical section on a larger scale through a portion of the two mold members in conjunction, showing the rubber stock seated therein; Fig. 4 is a sectional detail of a portion of one of the mold members, as illustrated by the line 4—4 on Fig. 2; Fig. 5 is a cross-sectional perspective view of a vulcanizing mold for the tube produced by the molds of Figs. 1 and 4; Fig. 6 is a cross-section of an inner tube in a tire casing, the tube being shown in solid lines as inflated and indicated by broken lines in its uninflated condition.

Describing the parts by the use of reference numerals, 1 and 2 indicate the upper and lower mold members, which are substantially identical, and in each of which is formed the annular channel 3 corresponding to the shape of half of the article as joined. These mold members are preferably in the nature of large plates and they may be secured by any suitable means to stationary and movable platens 5 and 6 of a suitable press (Fig. 1) the lower platen being adapted to be raised into co-action by a plunger 7 in the cylinder 8, by means of liquid forced through a pipe 10 under the control of a valve 9.

The rubber sheets are placed across the molds and are seated in the annular channels by pneumatic pressure, preferably suction. For such suction to be effective it is important that the sheet on the inner and outer sides of the channel be held to the mold. To enable such holding I provide annular grooves 15 and 16 immediately inside and outside of the edges of the channel, and supply suction to these grooves so that the rubber sheet is clamped to the face of the mold.

It is convenient to connect the annular grooves mentioned and the main channel with one source of suction, and to this end I provide a space 17 in the bottom portion of the mold member connected by openings 18 and 19 with the main channel 3 and the grooves 15 and 16, and I provide a suction pipe 20 in connection with space 17.

Fig. 3 shows rubber stock S after it has been seated by suction in the clamping grooves and the main channel. Between these grooves and channel are similar cutting edges 12 so formed that when two mold members are brought together, as shown in Fig. 3, the stock is sheared off at the edge of the main channel and a peripheral seam is formed.

In making inner tubes and similar annular articles which have a filling nipple, it is desirable to place the nipple between two pieces of stock after they are seated in their channels and before they are brought into conjunction. To provide for this, I make in each of the mold members 1 and 2 a radial passageway 22 which extends from the channel 3 to the inner edge of the mold member. This radial channel has on its opposite sides parallel cutting ribs 23. The ribs and radial channel bridge over the clamping groove 15, with which this channel is connected by a suitable suction opening 24.

In Fig. 6 I have shown an inner tube T with the usual metallic filling nipple N. This nipple has a metallic head $n$; surrounding the head is a rubber washer P, and around the nipple adjacent to the washer is a rubber sleeve Q.

In making such a tube, after the stock has been seated, as shown in the case of the lower mold member in Fig. 1, the nipple having a washer P and sleeve Q is placed in the stock which has been seated in the channel 22 by reason of suction through the opening 24. A nut R on the nipple and an adjacent washer V may bear against the inner edge of the mold member and thus cause the washer V to seat firmly against the rubber stock seated in the mold. The inner edge of the annular rubber sheet, when the stock is seated, is practically coterminous with the inner periphery of the mold so that the stock extends across the length of the channel 22. This is of such length that the sleeve portion formed by the two channels 22 houses the sleeve Q on the nipple. Now when the mold members are brought together by the operation of the plunger 7, this brings the cutting edges 12 together to shear off the stock and form peripheral seams. At the same time the cutting edges 23 cut off the stock along the opposite sides of the nipple and seam them together around the sleeve Q.

A convenient method of using the molds described, is to place annular rubber sheets (such as shown at S beneath the upper mold in Fig. 1) over the mold cavities, bringing the edge of the sheet downwardly to close the grooves 15 and 16, whereupon the vacuum passages may be opened, thus tightly drawing the edge of the rubber into these grooves and, in effect, pneumatically clamping the same over the surface of the mold members and across the mold channels. A continued application of atmospheric pressure by reason of vacuum within the chamber forces the rubber into the channels (as shown in the lower mold of Fig. 1) the rubber lying closely in contact with the mold surface.

The mold members may now be brought forcibly together, bringing the cutting edges 12 into contact, severing the rubber around the channel, the excess merely being forced into the space beyond the raised cutting edges as indicated in Fig. 3.

Before bringing the molds together, suitable expansible material such as ammonia powder may be deposited on the rubber within the cavity so that subsequent heating may cause expansion of the article into the close contact with the wall of the vulcanized mold cavity in a well known manner, or the molds may be brought together in an atmosphere of compressed air, entrapping such compressed air therein, which may provide the desired internal pressure for vulcanization.

After the molds have been brought together severing the articles within the channel from the exterior and interior portions of the sheet, these articles may be removed and placed in channels 30 formed in separable mold members 31 and 32, comprising the vulcanizing molds. These vulcanizing molds may conveniently be made of stamped metal; in use they are suitably secured together by means not shown. A suitable radial passage (not shown) provides for the housing of the nipple. Thus an inner tube such as shown at T in Fig. 5 may be produced.

To reduce the depth and consequent cost of the molds, as well as to provide for a more uniform thickness of wall of the tube as manufactured, I arrange the mold channels as shown in the drawings, so that they have a cross-section which adjacent to the edge is a substantially circular arch extending downwardly at 25 and then curved inwardly to an inward annular protuberance 26. When the rubber is drawn into such a mold, the central portion of the stock engages the surface of the protuberance before such region of the stock is stretched to a greater extent than the stock adjacent to the edges of the mold. Further stretching into the easy curve by which the sides of the channel merge with the central zone stretches the rubber but slightly more, with a result that when the article is forced completely to its seat, it is of substantially the same thickness throughout.

An inner tube of the peculiar form shown in Figs 5 and 6, namely; having a cross-section which is an elongated loop with a contracted waist, has advantages over an ordinary tube. One advantage is that the tube may be readily put in place through a comparatively narrow opening at the inner edge of a tire casing. Another advantage is that the tube is materially smaller when made than when inflated, resulting in a saving of rubber. I can make it smaller because the form shown allows the stretch to occur at the sides where it does no harm, without materially thinning the tread portion, where thickness is desired. It is obvious, however, that the apparatus may be employed for making inner tubes which do not have this peculiar form, as well as for making other annular articles.

This application is a continuation in part of my co-pending application No. 154,072 filed March 12, 1917 (now Patent No. 1,346,848 issued July 20, 1920), which shows an annular suction cavity embraced by annular raised cutting edges and provided with an annular suction clamping groove. Attention also should be called to my co-pending application No. 221,961, filed March 12, 1918, for a mold for making hollow rubber articles, as that application contains broad claims on a suctional clamping groove associated with a mold cavity.

I claim:—

1. In an apparatus of the character described, the combination of a pair of coöperating mold members each having a single cavity and each having an annular clamping groove surrounding the cavity, and means for applying suction to said groove.

2. In an apparatus of the character described, the combination of a mold member having a single cavity and having an annular clamping groove surrounding the cavity, and means for applying suction to the cavity and groove.

3. The combination in a mold of a cavity, two grooves on opposite sides of the cavity respectively, and means for applying suction to said grooves.

4. The combination of a mold member having an annular mold channel and two grooves on opposite sides of the channel respectively, and means for applying suction to said grooves.

5. The combination of a mold member having an annular mold channel and two grooves on opposite sides of the channel respectively, and means for simultaneously applying suction to said grooves and to the annular channel.

6. The combination of a pair of coacting mold members, each having an annular mold channel and two grooves on opposite sides of the channel respectively, means for applying suction to said grooves and to the annular channel, and means for thereafter bringing the mold members into conjunction.

7. The combination of a mold member having an annular mold channel, two raised cutting edges on opposite sides of the channel respectively, grooves beyond the cutting edges and means for applying suction to said grooves.

8. The combination of a mold member having an annular channel and an inwardly extending radial channel communicating with said annular channel and means for applying suction to the annular channel.

9. The combination of a mold member having an annular channel and lateral channel communicating with said annular channel, and means for applying suction to the lateral channel and to the annular channel.

10. The combination of a mold member having an annular channel and a lateral channel communicating with said annular channel, and suction grooves on the inner and outer sides of the annular channel.

11. The combination of a mold member having an annular channel and radial channel communicating with said annular channel, annular cutting edges on the inner and outer sides of the annular channel, and annular clamping grooves beyond the cutting edge.

12. An apparatus for making pneumatic inner tubes comprising a pair of mold plates, each having annular channels with cutting edges about their inner and outer periphery, and a lateral channel intersecting the cutting edge of the inner periphery.

13. An apparatus for making pneumatic inner tubes comprising a pair of mold plates, each having annular channels with cutting edges about their inner and outer periphery, and a radial channel intersecting the cutting edge of the inner periphery, and cutting edges on opposite sides of the radial channel.

14. An apparatus for making pneumatic inner tubes comprising a pair of mold plates, each having annular channels with cutting edges about their inner and outer periphery, a radial channel intersecting the cutting edge of the inner periphery, and means for applying suction to said annular channel.

15. An apparatus for making pneumatic inner tubes comprising a pair of mold plates, each having annular channels with cutting edges about their inner and outer periphery, and a radial channel intersecting the cutting edge of the inner periphery, cutting edges on opposite sides of the radial channel, and means for applying suction to the said channels.

16. The combination in a mold of an annular channel, two grooves on opposite sides of the channel respectively, a lateral channel communicating with the channel mentioned and crossing one of said grooves, and means for applying suction to said grooves.

17. The combination of a mold member having an annular channel with an annular protuberance in its base, a suction chamber, and passageway from said chamber to low points of said channel on opposite sides of said protuberance.

18. In an apparatus for manufacturing rubber tire tubes, the combination of two mold members adapted to coact and each having an annular groove in its face, said groove being formed with an annular protuberance in its base, and means for applying a superior pneumatic pressure to the outer face of rubber stock placed to bridge across the cavity.

19. In an apparatus for manufacturing rubber tire tubes, the combination of two mold members adapted to coact and each having an annular groove in its face, said groove being formed with an annular protuberance in its base, and means for applying suction to the cavity, enabling the formation of a tube with inwardly bowed sides.

20. In an apparatus for manufacturing rubber tire tubes, the combination of two mold members adapted to coact and each having an annular groove in its face, said groove being formed with an annular protuberance in its base, and annular ribs forming cutting edges on the faces of the molds about the inner and outer edge of the annular grooves.

21. A mold for making hollow rubber articles having a cavity with a raised cutting edge adjacent to it and means for exhausting air from said cavity.

22. In apparatus for making hollow rubber articles, a mold having a cavity and a raised cutting edge surrounding cavity and a passageway leading from the cavity.

23. In apparatus for making hollow rubber articles, the combination of coöperating mold members each having a cavity and a raised cutting edge surrounding cavity and means for exhausting air from the cavity.

24. The combination of a pair of mold members each having a cavity for forming a portion of the article, cutting edges surrounding the cavities and adapted to coöperate with each other to form a peripheral seam about the article and cut off the surplus stock, and means for exhausting air from the cavities to seat rubber stock therein.

25. The combination of a pair of coöperating molds each having a cavity surrounded by a raised cutting edge, means for holding sheet rubber stock against the faces of the molds outside of the cavities, means of exhausting air from the cavities to seat the stock, and means for bringing the mold members together to form a peripheral seam.

26. In an apparatus of the class described, the combination of a mold press having a pair of platens, one of which is movable, a pair of co-acting molds adapted to be mounted against the respective platens, said molds having cavities opposite each other and each having a raised cutting edge adjacent to the edge of the cavity, said raised cutting edges on the two molds coöperating to effect the seam and cut off surplus stock when the molds are brought together, and means for applying suction to the two cavities.

27. In an apparatus of the class described, the combination of a mold press having a pair of platens, one of which is movable, a pair of coacting molds adapted to be mounted against the respective platens, said molds having cavities opposite each other and each having a raised cutting edge adjacent to the edge of the cavity, and suction pipes communicating with the cavities, the pipe communicating with cavity of the movable mold being flexible.

28. In an apparatus of the character described, a pair of mold members having annular cavities, each with the raised cutting edge surrounding it, and means for exhausting the air from the cavities.

29. In an apparatus of the character described, combination of a pair of mold members having annular cavities therein, a raised cutting edge surrounding each cavity at its outer edge, said cutting adges on the two molds being opposite each other and adapted to form a peripheral seam on the article when the two molds are brought together, and means for exhausting air from the two cavities.

30. A mold for making hollow rubber articles having an annular cavity, a raised cutting edge adjacent to the outer edge of the cavity, and a passageway leading from the cavity.

31. A combination of a pair of co-acting mold members each having a cavity and a pair of cutting edges on opposite sides of the cavity, respectively, and means for exhausting air from the cavities.

32. A mold for making hollow rubber annular articles comprising a member having an annular cavity therein, raised cutting edges adjacent respectively to the inner and outer edges of the cavity, and a passageway leading from the cavity.

33. In an apparatus of the class described, the combination of a pair of co-acting mold members, each having an annular cavity therein and raised cutting edges located respectively adjacent to the inner and outer edges of the cavity, means for applying suction to the two cavities, and means for bringing the mold members together.

34. In an apparatus of the class described, the combination of a pair of co-acting mold members, each having an annular cavity therein and raised cutting edges located respectively adjacent to the inner and outer edges of the cavity, means for bringing the mold members together, and suction pipes connected with the two molds,—one of the molds being movable and the pipe connected therewith being flexible.

In testimony whereof, I hereunto affix my signature.

FRED THOMAS ROBERTS.